United States Patent [19]
Heskett

[11] Patent Number: 5,837,134
[45] Date of Patent: Nov. 17, 1998

[54] SCALE REDUCTION

[75] Inventor: Don E. Heskett, White Pigeon, Mich.

[73] Assignee: KDF Fluid Treatment Systems, Inc., Three Rivers, Mich.

[21] Appl. No.: 837,721

[22] Filed: Apr. 22, 1997

[51] Int. Cl.[6] .................................................. C02F 5/08
[52] U.S. Cl. .......................... 210/175; 99/286; 204/197; 210/192; 210/198.1
[58] Field of Search .............................. 99/286; 204/197; 205/745; 210/696, 175, 181, 192, 198.1, 205

[56] References Cited

U.S. PATENT DOCUMENTS

| | | | |
|---|---|---|---|
| 3,974,071 | 8/1976 | Dunn et al. | 210/696 |
| 4,531,046 | 7/1985 | Stover | 219/297 |
| 4,606,828 | 8/1986 | Wells | 210/696 |
| 4,820,422 | 4/1989 | Spencer | 210/696 |
| 4,889,041 | 12/1989 | Mahlich et al. | 99/285 |
| 5,013,450 | 5/1991 | Gomez | 210/696 |
| 5,113,751 | 5/1992 | Holcomb et al. | 99/286 |
| 5,204,006 | 4/1993 | Santoli | 210/696 |
| 5,433,856 | 7/1995 | Heskett | 210/638 |
| 5,695,644 | 12/1997 | Buchanan et al. | 210/198.1 |

OTHER PUBLICATIONS

Reeder, R.J. et al. 1990. Carbonates: Mineralogy and Chemistry. *Reviews in Mineralogy*, vol. 11, Mineralogical Society of America, 1990, pp. 241–245.

Meyer, H.J. The Influence of Impurities on the Growth Rate of Calcite. *Journal of Crystal Growth*, vol. 66, 1984, pp. 639–646.

Nestaas, I. and Terjesen, S.G. The Inhibiting Effect of Scandium Ions upon the Dissolution of Calcium Carbonate. *Acta Chemical Scandinavica*, vol. 23, 1969, pp. 2519–2531.

*Primary Examiner*—Peter A. Hruskoci
*Attorney, Agent, or Firm*—Lockwood, Alex, FitzGibbon & Cummings

[57] ABSTRACT

A method and system are disclosed for reducing the scale formation in a hot water reservoir in which a metal element of copper and/or zinc, and preferably brass, is positioned in the hot water in the reservoir.

12 Claims, 1 Drawing Sheet

SCALE REDUCTION

BACKGROUND AND DESCRIPTION OF INVENTION

The present invention relates generally to the reduction of scale formation and, more particularly, to a method and system which has been especially adapted to reduce the formation of scale in hot water reservoirs, such as the hot water reservoir of a coffee maker.

Scale formation is a chronic problem in heaters and reservoirs for heating and maintaining a volume of hot water and, in particular, tap water from a municipal source. In many parts of the country the available tap water has a high mineral content which tends to precipitate from the water and form a hard scale or coating on the hot water reservoir walls, heating elements and any other components which are consistently or continuously immersed in the hot water. This scale will progressively and severely impair the heating efficiency and frequently requires the periodic disassembly and cleaning or replacement of components.

Various approaches have been taken in the past in an attempt to reduce such scale formation. One approach has involved the use of zinc salts as additives to the water. These salts do function to reduce the formation of scale, but have the disadvantage of elevating the zinc ion level in the water. Moreover, zinc phosphate salts which have been employed in the past for the control of scale formation are not entirely satisfactory where the water to be treated is hot because the phosphates break down with heat. Also such zinc salts are not generally useful where the water is a potable or drinkable water, such as for a coffee maker.

Magnesium is also known to control scale formation, but has the disadvantage of producing undesirable smells in the form of hydrogen sulfide where sulfur may be present in the water.

Various elemental metals, such as brass, have been employed in the past in general to treat water, but typically for other reasons such as the reduction of bacteria or other living organisms in cooling tower water. In such applications, the cooling tower water has typically been run through a fine particulate or wool bed of the elemental metal or metal alloys in order to achieve this bactericidal function. When employing this process in cooling towers some degree of incidental scale reduction has also been noted. However, unlike the scale reduction in hot water reservoirs, the water in cooling towers is typically at ambient rather than elevated temperatures, and the cooling water circuit is for the most part a closed circuit, i.e. water is not repeatedly and continuously added or removed in large volumes.

Finely divided copper and brass have also been employed in a bed through which water is passed to remove calcium and magnesium ions from the water as described in my U.S. Pat. No. 5,433,856. However, that patent does not address the reduction of scale formation generally or more particularly in hot water environments.

In the present invention, it has been discovered that an element formed of an elemental metal, if positioned in a volume of hot water in a hot water reservoir, will result in the highly advantageous reduction and virtual elimination of scale formation on reservoir walls or the other components in the reservoir which are continuously or repeatedly exposed to the hot water. Specifically, the preferred element of the present invention is formed of the elemental metals copper and zinc and alloys thereof, preferably brass. The metal element of the present invention may actually take the form of a component of the hot water reservoir itself or may simply be added to the reservoir as an additional otherwise mechanically nonfunctional element in the operation of the reservoir. The principal advantage of the present invention is that the use of the elemental metals, such as brass, results in a substantial reduction in the presence of the metals in the water leaving the reservoir and any metallic ions thereof in the water product.

In one principal aspect of the present invention, a method of reducing scale formation in a hot water reservoir includes heating a volume of water in the reservoir, maintaining a volume of the heated water in the reservoir while adding new water and removing heated water from the reservoir, and positioning a quantity of a metal in the volume of heated water in the reservoir, the metal being exposed to the volume of heated water in the reservoir and comprising at least one of copper, zinc and mixtures thereof.

In another principal aspect of the present invention, a system for retaining and supplying hot water includes a reservoir for retaining and supplying the hot water, and means for heating the water. An inlet to the reservoir is provided for adding new water to the hot water that is already in the reservoir, and an outlet from the reservoir is provided for removing hot water from the reservoir. At least one metal element is positioned in the reservoir so as to be in the hot water therein, and the metal is exposed to the hot water in the reservoir and comprises at least one of copper, zinc and mixtures thereof.

In still another principal aspect of the present invention, the metal is an alloy of copper and zinc, and preferably, the ratio by weight of the copper to zinc is about 1:9 and 9:1, and more preferably 3:7 and 7:3.

In still another principal aspect of the present invention, the metal is brass.

In still another principal aspect of the present invention, the water is drinkable water.

In still another principal aspect of the present invention, the hot water reservoir is the reservoir of a coffee maker.

In still another principal aspect of the present invention, the metal element has a substantial and continuous surface of the metal exposed to the volume water in the reservoir, and the element may be selected from the group consisting of an elongate tube, plate, rod or spring which is positioned in the volume of heated water in the reservoir.

In still another principal aspect of the present invention, the volume of heated water is at least about 50° C.

In still another principal aspect of the present invention, the metal element is closely associated with the reservoir inlet and, in a preferred embodiment is positioned in the inlet.

These and other objects, features and advantages of the present invention will be more clearly understood through a consideration of the following detailed description.

BRIEF DESCRIPTION OF THE DRAWINGS

In the course of this description, reference will frequently be made to the attached drawing in which.

DESCRIPTION OF THE PREFERRED EMBODIMENTS

Figure 1:
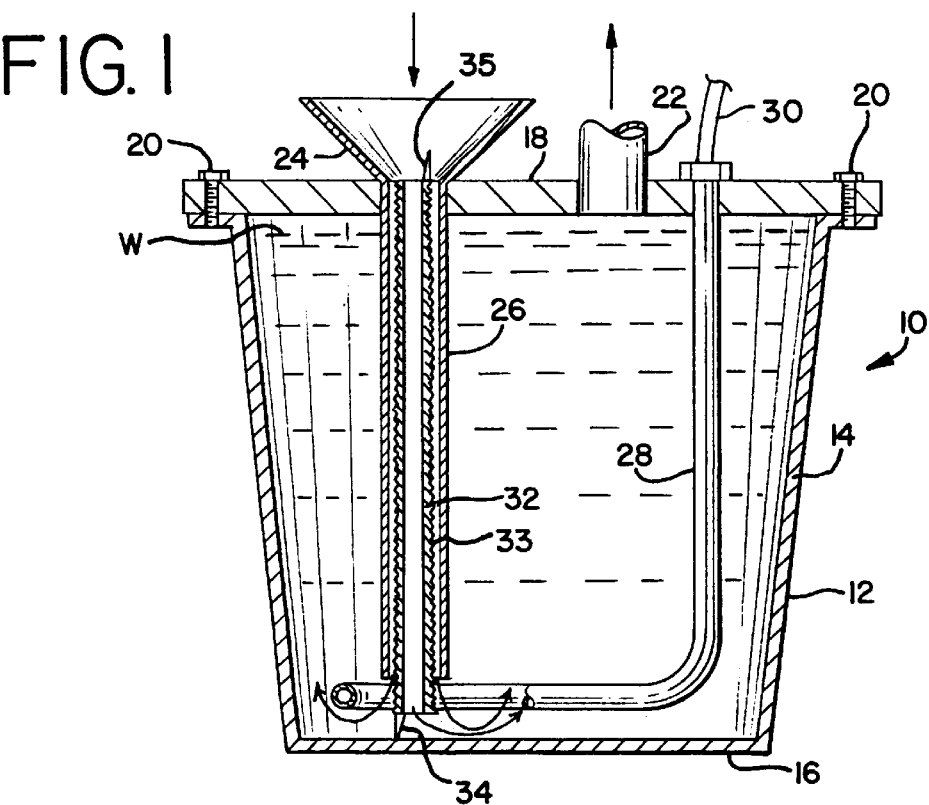
FIG. 1 is a schematic, cross-sectioned, elevational view of a hot water reservoir, such as that of a coffee maker, and in which a tubular metal element has been employed in accordance with a preferred embodiment of the present invention to reduce scale formation.

Several preferred embodiments of the present invention are shown in the drawings. With particular reference to FIG. 1, a hot water reservoir generally 10 comprises a vessel 12 which includes side walls 14 and a bottom wall 16. The vessel 12 may take any general shape, but is preferably cylindrical or frustoconical as shown in FIG. 1. The vessel 12 is also typically provided with a cover 18 which is fixed to the vessel 12 by suitable fasteners, such as bolts 20 shown in FIG. 1.

In a reservoir which is utilized to heat water and maintain a volume of the heated water therein for periodic use, an outlet 22 is typically provided in the cover 18 for discharging hot water from the top of the reservoir, and an inlet 24 having an inlet conduit 26 is provided for the input of fresh cold water to the vessel. As shown in FIG. 1, the inlet conduit 26 typically extends to adjacent the bottom wall 16 of the vessel 10 so that the fresh cold input water is discharged adjacent the bottom of the vessel and, as the water is heated, it rises toward the top of the vessel in readiness for discharge. The inlet 24 is shown schematically as having a funnel top in FIG. 1 simply for purposes of illustration. It will be appreciated that in many installations, including those for coffee makers, the flared funnel depiction as shown in FIG. 1 may not be present.

A heating element 28 is also shown in FIG. 1 as preferably attached to the cover 18 and extending about the bottom of the vessel 12 for heating the water in the vessel. The heating element 28 may obtain its energy from any one of a number of different heat sources. The heating element shown in FIG. 1 is an electrical heating element which is coupled to a source of electrical power (not shown) by a conductor or cord 30.

The various components of the hot water reservoir as thus far described are typically fashioned of a metal, such as stainless steel, which will withstand exposure to water at elevated temperatures without oxidation, degradation or the like over long periods of time. Although such metals may withstand degradation from the water over long periods of time, they are typically susceptible to the accumulation of layers of scale from the salts which are frequently present in the water which is heated and held in these reservoirs. This scaling may become particularly pronounced where the source of the water is high in hardness or salt content, and the scale deposits are exacerbated due to the elevated temperatures of the water which, for example in a residential or industrial water heater or in a hot water reservoir for a coffee maker, may be about 50° C. or more. This scaling will tend to continuously and progressively accumulate, and over time it may impair the function and operation of the hot water reservoir and its components, and necessitate early and frequent cleaning, maintenance and replacement of parts.

Accordingly, as previously mentioned, it is a principal purpose of the present invention to substantially reduce, if not eliminate altogether, the build up of scale in such hot water reservoirs. This is accomplished in the present invention by positioning a metal element in the volume of hot water W in the vessel 12, and which metal is of the kind that it substantially effects a reduction in the scale. It has been found in the present invention that metals including copper and zinc will substantially reduce scale build up in the hot water reservoir. These metals preferably are elemental in nature and are employed together as an alloy and, more particularly, as brass. The ratio by weight of the copper to zinc in the brass of the present invention is preferably between about 1:9 and 9:1, and more preferably between about 3:7 and 7:3.

The metal element preferably has a substantial and continuous surface of the metal which is exposed to the volume of the heated water in the reservoir. As shown in FIG. 1, the metal element is in the form of a tube 32 which is positioned in the inlet conduit 26. The outer surface of the tube 32 has been roughened, such as by threading at 33, to increase its surface area as shown in FIG. 1. It will be appreciated that such roughening is optional, may take anyone of a number of forms, and need not be limited to the outer surface of the element. The bottom of the tube 32 is preferably cut away to form a leg 34 on which the tube is supported to rest upon the bottom wall 16 of the vessel 12 as shown. Thus, the inlet water may freely pass through the tube 32 and/or around it and between it and the inner wall of the inlet conduit 26. The inlet water also can freely pass through and out of the lower end of the conduit 26 as shown by the arrows in FIG. 1 because the lower end is spaced from the bottom wall 16 by the leg 34. The upper end of the tube 32 may also be cut away if desired to form a leg 35 as shown in FIG. 1 to facilitate insertion and removal of the tube 32 in the inlet conduit 26 without the need to remove the cover 18 or disassemble the reservoir 10.

Figure 2:
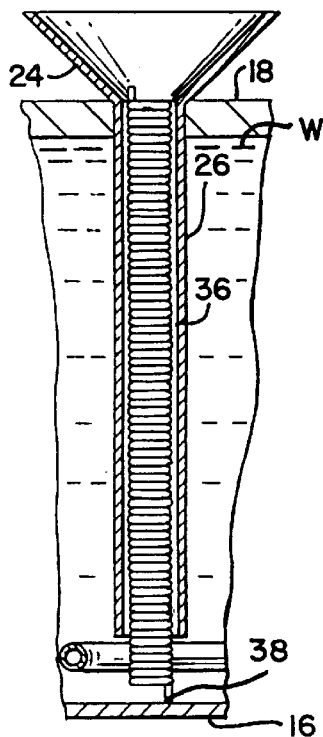
FIG. 2 is a partially broken, elevational view of FIG. 1 showing a second embodiment of the present invention in which instead of the metal tube of FIG. 1, a spring of the metal is employed in accordance with the principles of the present invention.

A second embodiment of metal element in accordance with the present invention is shown in FIG. 2. In this embodiment the metal element comprises a spring 36 having a bottom leg 38 to rest upon the vessel bottom wall 16 similar to the leg 34 as previously discussed.

Figure 3:
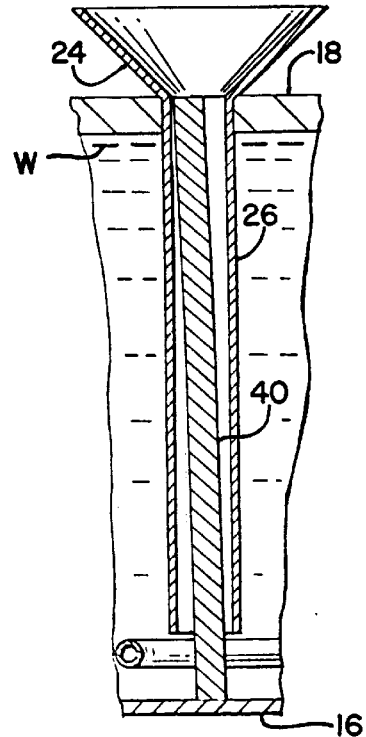
FIG. 3 is a partially broken, elevational view of FIG. 1 showing a third embodiment of the present invention in which instead of the metal tube of FIG. 1, a rod of the metal is employed in accordance with the principles of the present invention.
Figure 4:
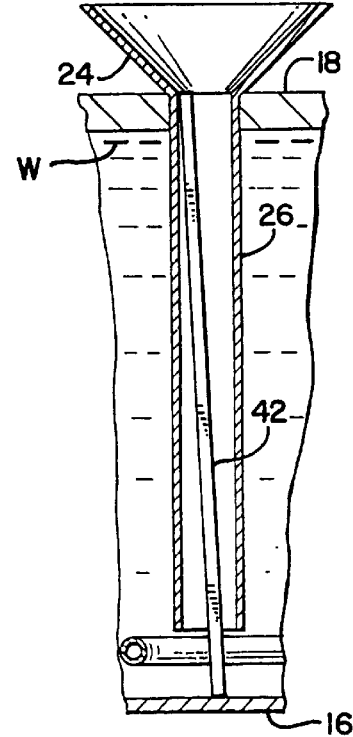
FIG. 4 is a partially broken, elevational view of FIG. 1 showing a forth embodiment of the present invention in which instead of the metal tube of FIG. 1, a loose plate of the metal is employed in accordance with the principles of the present invention.

Alternatively in a third embodiment, as shown in FIG. 3, the metal element of the present invention may be a rod 40 positioned in the inlet conduit 26 or, as shown in FIG. 4, may simply be a loose plate 42 positioned in the conduit 26.

It will be appreciated that although the metal elements of the present invention are all shown positioned in the inlet conduit 26, they need not be so positioned. They may simply be positioned anywhere in the hot water reservoir so long as their surfaces are exposed to the volume of heated water W in the reservoir. Moreover, the metal elements may, if desired, actually serve an additional function such as forming the inlet conduit 26 itself or some other mechanically functional element of the system.

Although it is not fully understood exactly how the metal element of the present invention functions to substantially reduce the build up of scale as it does, it is believed that the zinc component of the brass enters into the crystal growth of the scale weakening it and causing it to disintegrate and fail so that the scale is flushed out with the hot water. In turn, the copper component of the brass is believed to set up an electrical couple which prolongs the zinc activity by protecting it against oxidation from nitrates, oxides, phosphates, sulfates and other ions in the water.

EXAMPLE 1

Two identical Bunn coffee maker machines, VPR series, were connected to a municipal water service line. The municipal water was from the water supply of Three Rivers, Mich. and had a hardness of 308 ppm $CaCO_3$. The volume of the reservoirs of each of the coffee makers was 2000 ml. A brass tube was inserted into the water inlet conduit of the test coffee maker. The brass tube had a composition of about 60% copper and 40% zinc and was threaded on its outside surface to increase its effective surface area. The overall length of the tube was 12 inches, but a part of the bottom and top respectively were cut away to form a leg at each end. Each leg extended longitudinally from the respective ends of the body of the tube and each leg was about 1 inch long. The top leg was used to manipulate and position the tube in the inlet conduit of the coffee maker, and the tip of the bottom leg rested on the floor of the reservoir to support the tube in the inlet conduit. The wall thickness of the tube was about ⅛ inch and the diameter was about ½ inch. The diameter of the tube was less than the inner diameter of the water inlet conduit so that water introduced through the inlet passed both through and around the tube. The control coffee maker was identical to the test coffee maker, except that it did not include the brass tube.

Both coffee makers were set for a three minute on and three minute off cycle of operation, and each cycle was at a flow rate of 2000 ml for cycle (approximately one pot of coffee per cycle). At this rate each machine was given ten cycles per hour. Daily totals of municipal water were 160,000 ml. Temperatures of effluent water for both machines was 70° C. and this was also monitored daily. At the end of four days and 640,000 ml of water, both machines were disassembled and examined for scale growth.

To determine the amount of scale growth, all parts containing scale were immersed in a dilute hydrochloric acid solution. The solution was made by adding 500 ml of 28% hydrochloric acid to 3500 ml of deionized water. Once all of the scale had dissolved, the solution was buffered to a pH of 7.00 with 8N potassium hydroxide. Total scale formation as $CaCO_3$ for both the test and the control coffee makers were determined using Hack titration equipment and Hack Method 8213, EDTA digital titration.

Only 2.584 g of $CaCO_3$ was found in the test coffee maker, whereas 6.588 g of $CaCO_3$ scale was found to have formed in the control coffee maker. On this basis, scale formation in the test coffee maker was inhibited by an amount of 60.78%.

It will be understood that the preferred embodiments of the present invention which have been described are merely illustrative of the principles of the invention. Numerous modifications may be made by those skilled in the art without departing from the true spirit and scope of the invention.

I claim:

1. A system for retaining and supplying hot water, said system comprising:
    a reservoir for retaining and supplying the hot water;
    means for heating the water;
    an inlet to the reservoir for adding new water to the hot water that is already in the reservoir;
    an outlet from the reservoir for removing hot water from the reservoir; and
    at least one metal element comprising copper and zinc in the reservoir and positioned to be in the hot water therein, said metal element being exposed to the hot water in the reservoir and having a surface area of sufficient size and an effective amount of copper and zinc to substantially reduce the formation of scale during use of the reservoir, and wherein said metal element is in or closely associated with said inlet.

2. The system of claim 1, wherein said reservoir has a top and a bottom and said inlet extends from said top to adjacent said bottom.

3. The system of claim 2, wherein said metal element extends to adjacent said bottom.

4. The system of claim 1, wherein said metal element has a substantial and continuous surface of said metal exposed to the volume of hot water in the reservoir.

5. The system of claim 4, wherein said metal element is selected from the group consisting of an elongate tube, plate, rod or spring.

6. The system of claim 1, wherein said metal is an alloy of said copper and zinc.

7. The system of claim 6, wherein the ratio by weight of said copper to said zinc is between about 1:9 and 9:1.

8. The system of claim 7, wherein said ratio is between about 3:7 and 7:3.

9. The system of claim 1, wherein said metal is brass.

10. The system of claim 1, wherein said reservoir is the hot water reservoir of a coffee maker.

11. The system of claim 1, wherein said means for heating the water heats the water to at least about 50° C.

12. The system of claim 1, wherein said means for heating the water is positioned in the reservoir and in the water therein.

* * * * *